Patented July 3, 1934

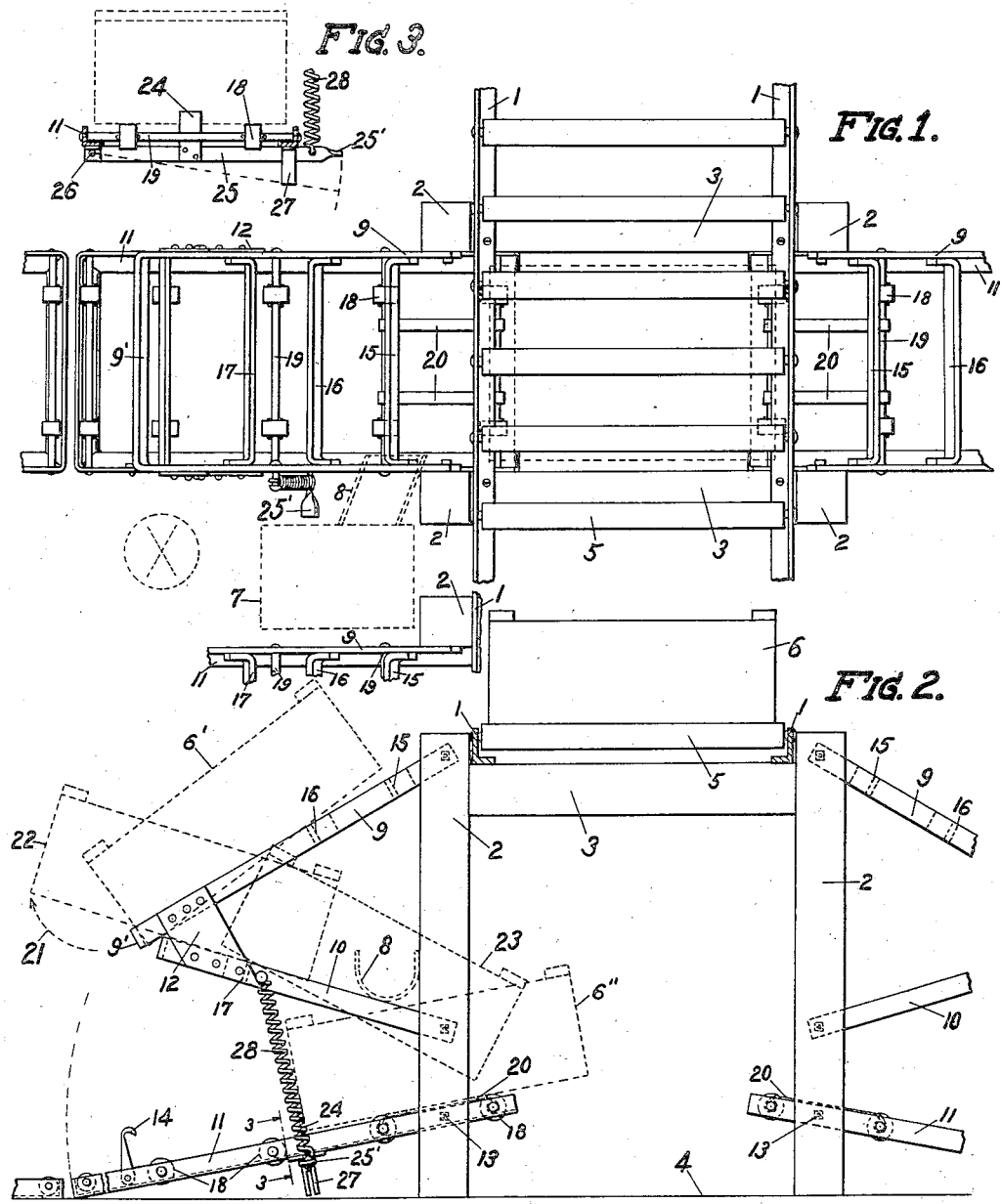

1,965,094

UNITED STATES PATENT OFFICE 1,965,094

CANNERY BOX HANDLING APPARATUS

Joseph P. Bem, Oakland, Calif., assignor to Pacific Pitting Machine Company Inc., Fresno, Calif., a corporation of California Application May 31, 1932, Serial No. 614,427

3 Claims. (Cl. 146—214)

This invention relates to canneries and has to do with the equipment for handling the boxes of fruit (or vegetables) which are worked upon by the operatives.

The principal object of the invention is to provide a combination of a conveyor for delivering loaded boxes of fresh fruit to an operative with a take-off rack for the boxes for each operative so that the operative can more easily handle oncoming successive boxes of fruit, operate on the fruit, and quickly get rid of re-filled boxes of fruit after completion of the work thereon by the operative. Other objects and advantages of the invention will appear in the following description and accompanying drawing.

In the drawing Fig. 1 is a plan view of my improved rack and conveyor combination.

Fig. 2 is an elevation of Fig. 1.

Fig. 3 is a sectional end view of a portion of Fig. 2 as seen from the line 3—3 of Fig. 2.

Briefly described the invention comprises a horizontally arranged conveyor of any desired construction for carrying filled boxes of fruit or vegetables to a row of girls in a cannery for cutting, coring, or peeling the fruit or otherwise preparing the fruit or vegetables for canning, in the present instance by the example given in the drawing, for pitting peaches as by one of my machines described in my copending patent application filed under Serial No. 492,774 on date of November 1, 1930.

In the drawing the horizontal conveyor is shown as of the ordinary roller type comprising a substantially horizontal or slightly inclined frame having two side bars 1 supported on posts and framework 2, 3 about table-high from the floor 4 and supporting idler rolls 5 to constitute a gravity or level roller conveyor, though any other form of conveyor will do, or just a plain table or track along which the boxes 6 are slid. The conveyor is of any desired length dependent on the size and arrangement of the cannery and a row of girl operatives sit on opposite sides of it and are spaced a few feet apart, each with her pitting machine in front of her. The position of one of such operatives is shown by the dotted X enclosed in a dotted circle and she faces the conveyor, or rather a pitting machine 7 shown in dotted lines and here considered as being of the type shown in my copending patent application filed under Serial No. 492,774 on November 1, 1930 for pitting peaches presented to the machine by the operative and from which pitted fruit and pits discharge from a chute dotted at 8.

The conveyor is kept filled with boxes of fruit to be operated upon, and with a row of girls on both sides of it, it would ordinarily be necessary for each girl to lift off a box of fruit as soon as she finished the previous box, and it is to facilitate the girls handling the heavy lug boxes of fruit that the especial features of my invention have been developed as follows:

To one side of each girl there is certain framework projecting from the side of the conveyor forming a take-off frame so that a box of fruit can be pulled bodily from the conveyor to rest on this framework, and the framework is so arranged that it accommodates the boxes in two different positions, one as dotted at 6' supported at a slant so that she can easily take the fruit from it piece by piece for presenting to the pitting machine, and the other as at 6" when empty so as to receive the pitted fruit from the chute 8 of the machine.

The side extension frames are of zig-zag form in side elevation having an upper, 9, intermediate, 10, and lower run, 11, and are suitably supported as by bolting to the standards of the frame 2 of the conveyor as shown. Sections 9 and 10 form a rigid V secured together at the apex by gusset plates 12, and section 11 pivots on its bolts 13 so as to swing upward and hook over the outer edge of frame 9 by means of a hook 14 to clear the floor when sweeping up and hosing out the cannery, but which in use extends angularly down and away from the conveyor with its outer end resting on the floor 4.

The upper section 9 is preferably made of strap iron sides 9 and end 9' and a couple of cross pieces 15, 16 so arranged that a full box of fruit may be pulled from the conveyor to be dragged downward at an angle over cross pieces 15, 16 to rest upon the latter and upon the outer end of section 10 with the end of the box dropped down between the sides 9 of the frame and stopped by the outer end 9' of the frame. The angular position 6' thus given the box is just right for convenient reach of the girl at X for taking the fruit therefrom. Section 10 of the frame is similar to section 9 except that it has but one intermediate cross piece at 17, and section 11 is provided with several idler rollers 18 mounted on cross rods 19 and also a pair of guides or tracks 20 extending between the first two rods. Sections 9 and 10 of the frame are wide enough for the boxes to fall through them so that when box 6' is empty it may be pulled outward and upward as along the dotted line 21 to position 22, and then canted under cross piece 16 of frame 9 and dropped to cross piece 17 and slid through position 23 and dropped to position 6'' on the lower frame section 11 where it is prevented from rolling off by a foot-operated stop 24 carried on a cross bar 25 pivoted at one end at 26 to one of the frame sides 11, and guided for vertical movement at its other end in slotted bracket 27 secured to the other frame side 11. The bar 25 extends beyond bracket 27 to form a foot pedal 25' and it is resiliently held in upper or latching position by a tension spring 28.

It is evident that cross bars 15, 16 and 17 over which the boxes slide may be rollers as shown at 18 on the lower frame 11, but in practice the plain bar is found good enough as the movement of the boxes is all downward.

The shifting of the boxes is done by one hand of the operative, in the present arrangement the left hand, though it may be on either side of the operative, all depending on the particular type of machine she is using, or whether she is hand pitting, cutting or peeling the fruit, vegetable, or whatever the commodity may be.

In operation, and with an empty box 6'' and a full box at 6', the fruit is taken from the upper box 6', pitted and discharged through chute 8 into box 6'' until the latter box is full and the upper one empty. Treadle 25' is then pressed to pull down latch 24 so that box 6'' rolls off to any suitable receiving conveyor or to the floor, and the now empty box 6' is dropped to position 6'' in the manner described, and a fresh box full of fruit is yanked from the conveyor to position 6', it being understood that the conveyor is kept filled with boxes so that they are aligned with each zig-zag or take-off frame, and that as soon as a box is removed from the conveyor the gap closes by gravity or a source of power.

The invention as described permits the rapid change of boxes with little or no effort on the part of the operatives and without leaving their seats, and while I have shown specific framing to accomplish the results desired it is manifest that the framing may take various forms to accomplish the end intended as the underlying invention is the supporting of the boxes in the various positions and means for easy shifting from one to the other.

I claim:—

1. Packing plant apparatus for handling fruit boxes comprising an upper steeply inclined rack provided with means adapted to hold a lug-box of fruit in fixed slanted position relative to the floor so the fruit will gravitate to the lower end of the box as it is successively removed, and said rack having an opening through which the box may be shifted and dropped, a lower rack substantially in alignment with and spaced beneath the upper rack and positioned to receive the box when dropped through the upper rack, said lower rack inclined sufficiently to normally cause the box to slide therefrom, a stop holding the box in place on said lower rack, and means for manually operating said stop to permit the box to slide from said lower rack.

2. In a structure as specified in claim 1, guiding support for the box positioned intermediate the upper and lower racks arranged to take the weight of and guide the box while being shifted from the upper to the lower rack.

3. In a structure as specified in claim 1, a bar extending transversely of the racks positioned at a point intermediate the upper and lower racks arranged to support the weight of the box while being shifted from the upper to the lower racks.

JOSEPH P. BEM.